United States Patent
Bala

(10) Patent No.: US 6,224,256 B1
(45) Date of Patent: *May 1, 2001

(54) COVER FOR MEDICAL PROBE

(76) Inventor: Harry Bala, 7 Corey Dr., South Barrington, IL (US) 60010

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,661

(22) Filed: Jun. 18, 1998

(51) Int. Cl.$^7$ ................. G01K 1/08; G01K 1/16
(52) U.S. Cl. ............................................. 374/158
(58) Field of Search .................. 374/158, 209, 374/151

(56) References Cited

U.S. PATENT DOCUMENTS

| | | | |
|---|---|---|---|
| 3,117,450 | * 1/1964 | Hoy ....................... | 374/151 |
| 3,282,106 | 11/1966 | Barnes .................... | 331/9 |
| 3,812,847 | 5/1974 | Moore et al. ............. | 600/200 |
| 3,942,891 | 3/1976 | Spielberger et al. ...... | 374/126 |
| 3,949,740 | 4/1976 | Twentier ................. | 600/200 |
| 4,072,054 | * 2/1978 | Blouin et al. ........... | 374/151 |
| 4,159,766 | 7/1979 | Kluge .................... | 374/209 |
| 4,602,642 | 7/1986 | O'Hara et al. ........... | 374/158 |
| 4,662,360 | 5/1987 | O'Hara et al. ........... | 374/158 |
| 4,784,149 | 11/1988 | Berman et al. ........... | 374/129 |
| 4,790,324 | 12/1988 | O'Hara et al. ........... | 374/158 |
| 4,797,840 | 1/1989 | Fraden ................... | 374/133 |
| 4,863,281 | 9/1989 | Suszynaski .............. | 374/158 |
| 4,911,559 | 3/1990 | Meyst et al. ............ | 374/158 |
| 5,088,834 | 2/1992 | Howe et al. ............. | 374/200 |
| 5,163,418 | 11/1992 | Fraden et al. ........... | 374/158 |
| 5,179,936 | 1/1993 | O'Hara et al. ........... | 374/158 |
| 5,293,862 | 3/1994 | O'Hara et al. ........... | 374/158 |
| 5,611,622 | * 3/1997 | Wang .................... | 374/151 |
| 5,906,437 | * 5/1999 | Lin ...................... | 374/158 |
| 5,980,451 | * 11/1999 | O'Hara et al. .......... | 600/121 |
| 6,022,140 | * 2/2000 | Fradeu et al. .......... | 374/153 |
| 6,042,266 | * 3/2000 | Cheslock et al. ........ | 374/158 |
| 6,051,293 | * 4/2000 | Weilandt ................ | 374/209 |

* cited by examiner

Primary Examiner—G. Bradley Bennett
Assistant Examiner—Gail Verbitsky
(74) Attorney, Agent, or Firm—George H. Gerstman; Seyfarth Shaw

(57) ABSTRACT

A cover for a medical probe comprises a generally tubular membrane having a closed end and an open end. A mounting ring is provided, having a bond to the tubular membrane adjacent to the open membrane end. The mounting ring preferably has a first ring portion shaped to lock into engagement with the medical probe while the probe has a forward portion extending into the tubular membrane. The mounting ring also has a second ring portion which carries the bond to the tubular membrane, and which is attached to the first ring portion in a resilient manner, to permit the membrane and mounting ring to be longitudinally stretched by the medical probe when mounted therein, with the first ring portion being locked on the probe in said engagement. Typically, the tubular membrane comprises an inner tubular membrane portion and an outer tubular membrane portion. The outer tubular portion comprises the closed end, and is made of typically an infrared-transparent plastic material. The inner tubular membrane is open at both ends and comprises a plastic material of reduced coefficient of friction compared with the outer tubular membrane, to facilitate the insertion of a medical probe in relatively tight fitting relationship, so that the probe may stretch the tubular membrane, providing a flat, stretched, infrared-permeable, closed end for the transmission of infrared radiation into the medical probe for medical measurements.

22 Claims, 2 Drawing Sheets

COVER FOR MEDICAL PROBE

BACKGROUND OF THE INVENTION

Covers for medical probes are well known and come in various designs. For example, in Fraden et al. U.S. Pat. No. 5,163,418, a speculum cover for an infrared thermometer is disclosed, where a pleated cover surrounds the probe that is inserted into the ear, for example, for taking of a body temperature by measurement of infrared (IR) radiation.

A similar probe is disclosed in O'Hara et al. U.S. Pat. No. 5,179,936, in which an ear canal probe of a tympanic thermometer has a cover comprising a molded plastic sheath with a separate front membrane which is made of IR transparent material.

As a disadvantage, potentially the best IR transparent, flat plastic films such as polyethylene have common ingredients added to reduce the surface tack, which can interfere with IR transparency. Such materials without such ingredients thus exhibit an undesirable surface tack, so that sheaths made of such a material are difficult to use. Also, structures which are pleated, or which have a separate front end made of a different, IR transparent material bonded to the rest of the sheath, are difficult to reliably manufacture so that they do not tend to break or fail in use. Thus their cost is undesirably high.

By this invention, inexpensive, easily manufactured probes are provided in which plastic materials of the highest infrared or other radiation transparencies can be used without interfering with the ease of use of the probe sheath, or a diminishment of its reliability.

DESCRIPTION OF THE INVENTION

By this invention, in one embodiment a cover for a medical probe is provided which comprises a generally tubular membrane having a closed end and an open end, and a mounting ring secured to the tubular membrane adjacent to the open membrane end, typically with an annular bond. In one embodiment, the mounting ring may have a first ring portion which is shaped to lock into engagement with the medical probe, while the probe has a probe member forward portion extending into the tubular membrane. The mounting ring also has a second ring portion carrying the securing bond to the tubular membrane. The second ring portion is attached to the first ring portion in a resilient manner to permit the membrane and mounting ring to be longitudinally stretched by the medical probe when mounted thereon, with the first ring portion being locked on the probe.

The tubular membrane typically comprises a film of plastic that is substantially transparent to typically infrared radiation. Preferably, that film is in the form of a closed-end plastic tube, which is positioned outside of an open-ended tube and bonded thereto, the open ended tube comprising a plastic material such as plastic film which has relatively low friction. Thus, the medical probe can easily enter into the generally tubular membrane, since it slides through the interior of the open-ended tube. The only barrier at the distal or outer end of the tube is the closed end of the outer, closed end tube, which is made of the infrared or other radiation-transparent material. Thus, the tubular probe sheath is easily applied and removed from the medical probe, while a highly desirable grade of infrared permeable membrane can be used, so that the sensor of the probe receives adequate infrared radiation through the outer end of the sheath.

Optionally, first and second ring portions as described above comprise a pair of rings that are coaxially bonded together. The second ring portion is bonded to the tubular membrane at a ring section that is axially flexible, to permit the membrane and the mounting ring to be axially stretched when mounted on a probe. Thus, it becomes possible for probe sheaths of this invention to be quite forgiving of dimensional variations that may take place due to differences in the medical probe design, and variations from lot to lot of the dimensions of the probe sheath. When applied to the medical probe, the probe sheath is normally stretched to a certain extent by the projecting probe, which presses against the outer end of the probe sheath. The amount of stretching from unit to unit may vary to a degree, due to planned or unplanned dimensional variations of the two systems, but the outer end of the probe sheath will normally be placed under some level of tension to smooth it out, thus forming an infrared-transparent window.

DESCRIPTION OF SPECIFIC EMBODIMENTS

Figure 1:
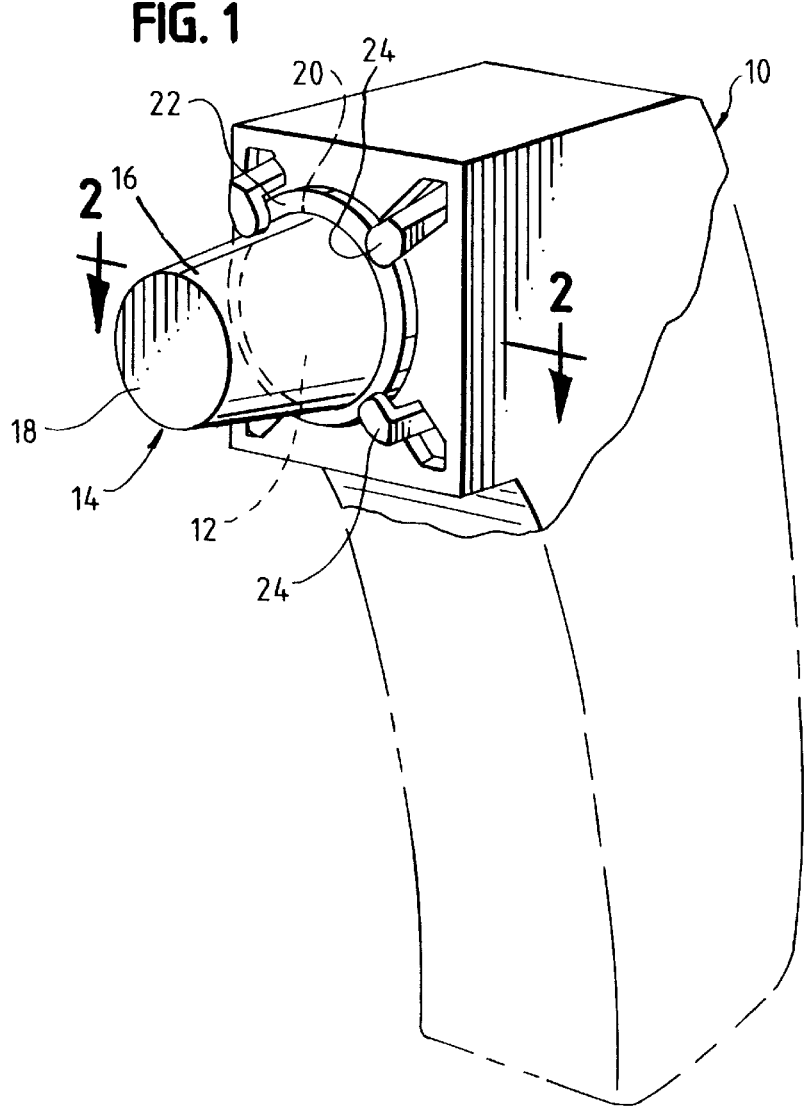
FIG. 1 is a perspective view of a conventional medical tympanic probe for measurement of body temperature from the ear drum, shown with an attached probe sheath, which is typically disposed of and replaced between uses.
Figure 2:
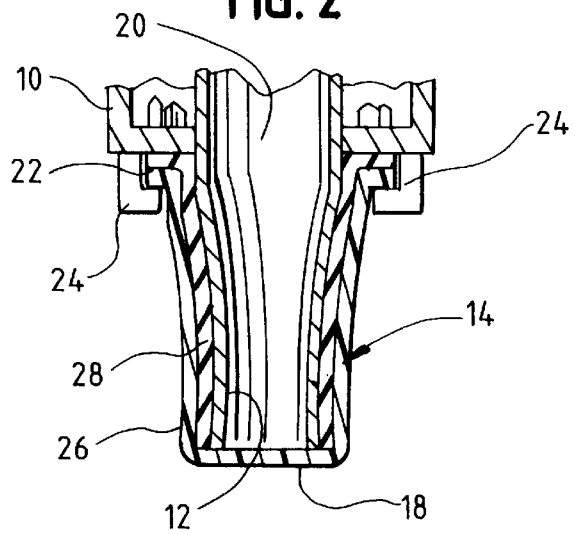
FIG. 2 is a sectional view taken along line 2—2 of FIG. 1.

Referring to FIGS. 1 and 2, an infrared measuring probe (tympanic thermometer) 10 for measuring body temperature through the ear channel is shown, having an extending forward portion or probe member 12 which is covered by a removable probe sheath or cover 14. Cover 14 comprises a generally tubular membrane 16 having a closed, outer end 18 and an open inner end 20. A mounting ring 22 is attached with an annular bond to the tubular membrane 16 adjacent to open membrane end 20. This may be formed from flat plastic film. Mounting ring 22 is shown to be clamped in position about the projecting probe member 12 of the medical tympanic thermometer 10 by means of clamp members 24 or other equivalent devices such as a retention ring, or the like. Thus, probe sheath 14 is removably attachable and detachable from tympanic thermometer 10, so that it may be replaced, typically after every use, so that the thermometer may be used in sanitary manner with a series of patients.

Referring particularly to FIG. 2, it can be seen that sheath 14 comprises an outer sheath 26 and an inner sheath 28. Outer sheath 26 may be made of an infrared-transparent plastic material such as low density polyethylene which is free of slip additives, or polypropylene, a polyester such as a biaxially oriented polyester (Mylar), or the like, all of which may be free of additives which absorb infrared radiation. Outer sleeve 26 defines the closed end 18, so that infrared radiation passes through the closed end into the hollow, tubular probe member 12, which can be seen to have an open end adjacent to end membrane 18.

The thickness of the infrared-permeable film forming membrane 18 may be on the order of 0.0005 inch.

A layer of material such as dye, or ink may be placed on the film as desired, particularly at the end wall 18, to adjust the radiation transparent characteristics through the membrane. This can be used to adjust the radiation transmittance characteristics of varying lots of film to get a constant transmittance in the product by appropriate variation of the thickness of the material applied to the film. For example a 0.0005 inch polypropylene or Mylar polyester film may be coated by conventional means with Saran or varnish to 0.0001–0.00015 inch thickness.

Inner sheath 28 of probe cover 14 may comprise any desirable plastic, which does not have to be infrared permeable since it has an open, outer end adjacent to end membrane 18. Thus it does not interfere with the transmission of infrared radiation into hollow, tubular probe member 20 of the tympanic thermometer 10. Inner tubular sleeve 28 is present to provide strength or shape to the cover, and also to provide an inner surface which has a low coefficient of friction, unlike for example an additive-free, low density polyethylene of which outer sleeve 26 may be made. Thus, tubular probe member 12 of the tympanic thermometer may be easily inserted in close, sliding relationship with the interior of probe sheath 14, because of the low coefficient of friction preferably found in the plastic material of inner sheath 28. Thus, sheath 14 slides easily in close-fitting relationship onto hollow, tubular probe member 12, with probe member 12 being typically made of metal or other rigid material.

Mounting ring 22 is clamped into position by clamps 24, with the length of sheath 14 being typically slightly less than the length of tubular probe member 12, so that sheath 14 is held in a stretched condition, so that end film 18 assumes a tight, flat configuration for the maximum introduction of infrared or other radiation without distortion or loss. Tubular probe 12 may have an outer, quartz window or the like adjacent to end membrane 18 if desired.

Figure 3:
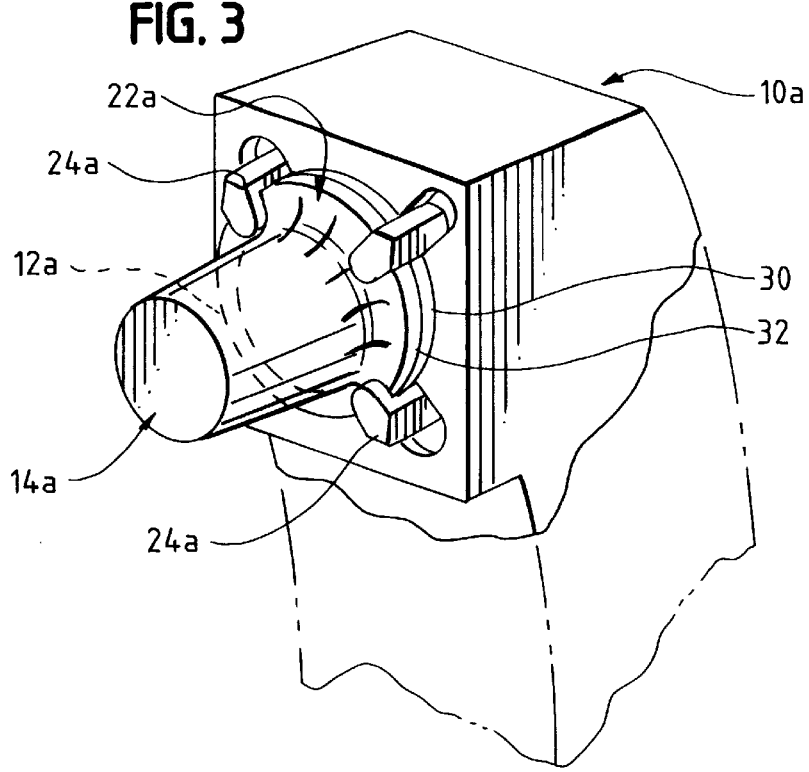
FIG. 3 is a perspective view of the tympanic probe of FIG. 1, having a different embodiment of probe sheath carried thereon.
Figure 4:
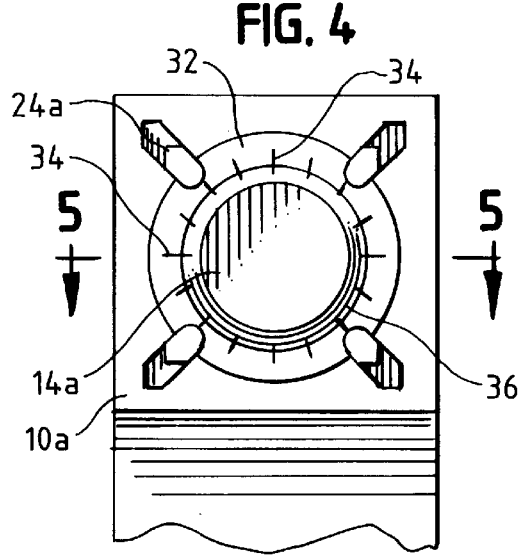
FIG. 4 is an elevational view of the probe sheath mounted on the tympanic probe as shown in FIG. 3.
Figure 5:
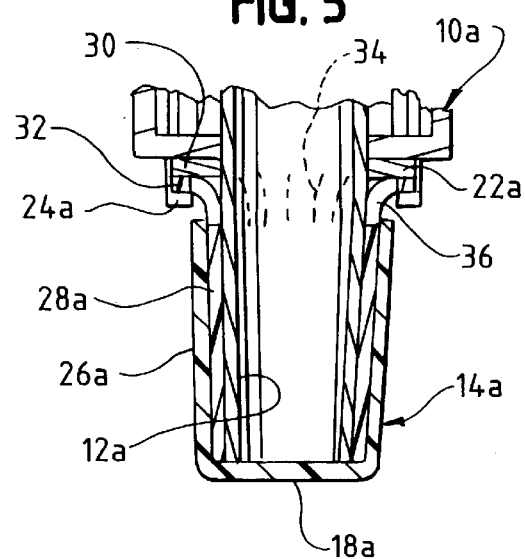
FIG. 5 is a sectional view taken along line 5—5 of FIG. 4.

Turning to FIGS. 3–5, a similar or identical tympanic thermometer 10a is shown to be holding in similar manner another embodiment of a probe sheath or cover 14a of this invention, positioned about probe member 12a of the thermometer. As before, sheath 14a has a mounting ring 22a which is held in position by clamps 24a.

FIG. 5 shows sheath 14a to comprise an outer plastic tubular sheath 26a and a bonded inner plastic tubular sheath 28asimilar to the previous embodiment except that tubular sheath 26a is shortened and not engaged by clamps 24a. Apart from the above, the construction and selection of materials of the respective sheaths 26a28a can be similar to the previous embodiment, and the overall sheath 14a can function in similar manner, except as otherwise described herein.

Second, inner sheath 28, 28a may comprise a paper-plastic laminate, thin-walled polypropylene, or the like.

In the embodiment of FIGS. 3–5, mounting ring 22a comprises a pair of rings 30, 32 bonded together in coaxial relation to comprise ring portions of the mounting ring 22a.

First ring portion 30 is shaped to lock into engagement with medical probe 10a by means of clamps 24a, as in the previous embodiment. However, the second ring portion 32, which is peripherally bonded to ring 30, has a series of inner radial slits 34 to provide a radially inner ring portion 36 which is flexible and subject to axial deflection as particularly shown in FIG. 5, where the segments of ring portion 36 defined by the slits 34 are shown to be pulled in an axial manner away from first ring portion 30. In the inner ring portion, segments 36 are bonded to the open end of sheath 14a in a conventional manner.

In this embodiment, the overall sheath 12a and its mounting ring 22a can be designed to be slightly shorter than the overall length of tubular probe member 12a when sheath 14a is inserted onto the probe for use, and mounting ring 22a clamped in position by clamps 24a or another securing device. On mounting, the entire sheath is thus stretchable due to the resilience provided by the flexibility of second ring 32, and is so stretched. This stretchability is created at least in part by the presence of inner, radial slits 34, permitting the inner portions 36 of ring 32 to bend axially in a plurality of sections while remaining bonded to the inner end of sheath 14a. Thus, a longitudinal, stretchable characteristic can be provided to the sheath, causing infrared transparent end membrane 18a to be taut, while also providing a dimensional tolerance to the system. This permits some variation in the length of probe member 12a and some variation in the length of sheath 14a, so that manufacturing specifications and tolerances can be simplified. In some circumstances, the same sheath can be used with different designs of medical probes 10, 10a.

If desired, different designs of slits 34 may be provided, for example one or more circumferential lines of bending weakness formed in second ring 32, to provide the equivalent outward bending of a portion of ring 32, while another portion remains bonded to first ring 30, to provide a similar longitudinal resilience to the sheath of this invention. In this case the plastic film of tubular layers 26a, 28a can be made of materials which are substantially inelastic, and a good, tight fit of probe member 12a with end membrane 18a can still be achieved.

If desired, mounting ring 22 of FIGS. 1–2 may be made of rubber, and may be a single ring, to achieve equivalent stretching characteristics. In that circumstance, outer tubular layer 26 might be spaced from ring 22.

The above has been offered for illustrative purposes only, and is not intended to limit the scope of the invention of this application, which is as defined in the claims below.

That which is claimed:

1. A cover for a medical probe, which comprises:
   a generally tubular membrane having a closed end and an open end; and
   a unitary mounting ring having a bond to the tubular membrane adjacent to said open membrane end, said mounting ring having a first ring portion shaped to lock into engagement with said medical probe while the probe has a forward portion extending into said tubular membrane, said mounting ring having a second ring portion carrying said bond, said second ring portion being attached to said first ring portion in a resilient manner to permit said membrane and mounting ring to be longitudinally stretched by said medical probe when mounted thereon with the first ring portion being locked on said probe in said engagement.

2. The cover of claim 1 in which said tubular membrane comprises a film of plastic that is substantially transparent to infrared radiation at said closed end.

3. The cover of claim 1 in which said first and second ring portions comprise a pair of rings that are coaxially bonded together, said second ring portion being bonded to said tubular membrane at a ring section that is axially flexible, to permit said membrane and mounting ring to be axially stretched when mounted on a probe.

4. The cover of claim 1 in which said tubular membrane comprises a film of plastic which is flexible but substantially inelastic.

5. The cover of claim 1, said cover being mounted on a medical probe with said first ring portion being locked in said rigid engagement with the probe, the probe having a forward portion extending through said tubular membrane and abutting the closed end in a manner that holds the membrane and mounting ring in longitudinally stretched relation.

6. The cover of claim 1, for use with an infrared thermometer probe.

7. The cover of claim 1 in which said generally tubular membrane comprises an inner sheath and an outer sheath bonded together said inner sheath comprising a tube having open inner and outer ends and made of a material having a relatively low coefficient of friction compared with the inner sheath, the outer sheath having a closed outer end and an open inner end, and being made of a material having transparency to a desired wavelength of electromagnetic radiation.

8. The cover of claim 7 in which said outer sheath is made of a material which is more highly transparent to infrared radiation than said inner sheath.

9. The cover of claim 8 in which said first and second ring portions comprise a pair of rings that are coaxially bonded together, said second ring portion being bonded to said tubular membrane at a ring section that is axially flexible, to permit said membrane and mounting ring to be axially stretched when mounted on a probe.

10. The cover of claim 9 in which the outer sheath of said tubular membrane comprises a film of plastic which is flexible but substantially inelastic.

11. The cover of claim 9, said cover being mounted on a medical probe with said first ring portion being locked in said rigid engagement with the probe, the probe having a forward portion extending through said tubular membrane and abutting the closed end in a manner that holds the membrane and mounting ring in longitudinally stretched relation.

12. The cover and medical probe of claim 11 in which said medical probe is an infrared thermometer.

13. The cover of claim 1 in which said membrane is coated with a material to adjust the radiation transmittance.

14. The cover of claim 3 in which said second ring portion defines radial slots to facilitate said axial flexibility.

15. A cover for a medical probe, which comprises:

a generally tubular membrane having a closed end and an open end; and a mounting ring member, said ring member having a first portion shaped to lock into engagement with said medical probe, said ring member having a second portion bonded to the tubular membrane adjacent to the open membrane end, said second portion being capable of resilient movement to permit the membrane and second portion to be longitudinally stretched, with the first portion being locked on said probe in said engagement.

16. The cover of claim 15 in which said tubular membrane comprises a film of plastic that is substantially transparent to infrared radiation at said closed end.

17. The cover of claim 16 in which said film of plastic is flexible but substantially inelastic.

18. The cover of claim 15, said cover being mounted on a medical probe with said probe having a forward portion extending through said tubular membrane and abutting the closed end in the manner that holds the membrane and mounting ring member in longitudinally stretched relation.

19. The cover of claim 15 in which said generally tubular membrane comprises an inner sheath and an outer sheath bonded together, said inner sheath comprising a tube having open inner and outer ends and made of a material having a relatively low coefficient of friction compared with the inner sheath, the outer sheath having a closed outer end and an open inner end, and being made of a material having transparency to a desired wavelength of electromagnetic radiation.

20. The cover of claim 15 in which said membrane is coated with a material to adjust the radiation transmittance.

21. A cover for a medical probe, which comprises:

a generally tubular membrane having a closed end and an open end; and a mounting ring having a bond to the tubular membrane adjacent to said open membrane end, said mounting ring having a first ring portion shaped to lock into engagement with said medical probe while the probe has a forward portion extending into said tubular membrane, said mounting ring having a second ring portion carrying said bond, said second ring portion being connected to said first ring a portion in a resilient manner to permit said membrane and mounting ring to be longitudinally stretched by said medical probe when mounted thereon with the first ring portion being locked on said probe in said engagement.

22. The cover of claim 21 in which said mounting ring member carries a plurality of radial slits permitting portions of said ring member to bend axially in a plurality of section while remaining bonded to the inner end of said sheath.

* * * * *

UNITED STATES PATENT AND TRADEMARK OFFICE
CERTIFICATE OF CORRECTION

PATENT NO. : 6,224,256 B1
DATED : May 1, 2001
INVENTOR(S) : Bala

It is certified that error appears in the above-identified patent and that said Letters Patent is hereby corrected as shown below:

Column 5,
Line 9, after "together" insert -- , --.
Line 11, "inner" should be -- outer --.

Column 6,
Line 20, "inner" should be -- outer --.
Line 37, delete "a".
Line 44, "section" should be -- sections --.
Line 45, "said" should be -- a --.

Signed and Sealed this

Eighteenth Day of December, 2001

Attest:

*Attesting Officer*

JAMES E. ROGAN
*Director of the United States Patent and Trademark Office*